United States Patent [19]
Story et al.

[11] Patent Number: 5,809,333
[45] Date of Patent: Sep. 15, 1998

[54] SYSTEM FOR IMPLEMENTING PERIPHERAL DEVICE BUS MASTERING IN DESKTOP PC VIA HARDWARE STATE MACHINE FOR PROGRAMMING DMA CONTROLLER, GENERATING COMMAND SIGNALS AND RECEIVING COMPLETION STATUS

[75] Inventors: Franklyn H. Story, Chandler; David R. Evoy, Tempe; Peter Chambers, Scottsdale; Lonnie Goff, Tempe, all of Ariz.

[73] Assignee: VLSI Technology, Inc., San Jose, Calif.

[21] Appl. No.: 627,988

[22] Filed: Apr. 8, 1996

[51] Int. Cl.⁶ ............................. G06F 9/00; G06F 13/00
[52] U.S. Cl. ..................... 395/842; 395/825; 395/827; 395/843; 395/847; 364/240.5; 364/242.31
[58] Field of Search ................................. 395/287, 294, 395/821, 847, 848, 200, 290, 842, 800, 825, 843; 364/200, 240.5, 242.31

[56] References Cited

U.S. PATENT DOCUMENTS

| | | | |
|---|---|---|---|
| 4,901,232 | 2/1990 | Harrington et al. | 364/200 |
| 5,444,855 | 8/1995 | Thompson | 395/287 |
| 5,488,695 | 1/1996 | Cutter | 395/290 |
| 5,513,368 | 4/1996 | Garcia, Jr. et al. | 395/842 |
| 5,546,547 | 8/1996 | Bowes et al. | 395/294 |
| 5,561,819 | 10/1996 | Gephardt et al. | 395/847 |
| 5,561,821 | 10/1996 | Gephardt et al. | 395/848 |
| 5,603,050 | 2/1997 | Wolford et al. | 395/821 |
| 5,640,585 | 6/1997 | Smoot, III et al. | 395/800 |

*Primary Examiner*—Thomas C. Lee
*Assistant Examiner*—David Ton
*Attorney, Agent, or Firm*—Jeffrey D. Moy; Allen J. Moss; Harry M. Weiss & Associates, P.C.

[57] ABSTRACT

The present invention is a desktop personal computer (PC) system having peripheral device bus mastering. The system has four main elements: a Direct Memory Access (DMA) controller, a hardware state machine, a bus controller, and a device controller. The device controller may be an IDE hard disk controller which is able to generate long streams of data in an intermittent fashion wherein any single stream of data is targeted to a number of different host memory locations. The device controller may also be an ECP parallel port controller which interfaces with a number of different peripheral devices over a parallel bus wherein each peripheral device appears to the system as a separate and independent data path.

20 Claims, 2 Drawing Sheets

SYSTEM FOR IMPLEMENTING PERIPHERAL DEVICE BUS MASTERING IN DESKTOP PC VIA HARDWARE STATE MACHINE FOR PROGRAMMING DMA CONTROLLER, GENERATING COMMAND SIGNALS AND RECEIVING COMPLETION STATUS

RELATED APPLICATIONS

This application is related to the applications entitled "SYSTEM FOR IMPLEMENTING PERIPHERAL DEVICE BUS MASTERING AND METHOD THEREFOR," Ser. No. 08/627,989, "A MOBILE COMPUTER SYSTEM HAVING PERIPHERAL DEVICE BUS MASTERING AND METHOD THEREFOR," Ser. No. 08/627,987, "SYSTEM AND METHOD FOR IMPLEMENTING PERIPHERAL DEVICE BUS MASTERING IN A MOBILE COMPUTER SYSTEM VIA A UNIVERSAL SERIAL BUS CONTROLLER OR AN INFRARED DATA ASSOCIATION CONTROLLER," Ser. No. 08/627,986 and "A DESKTOP PERSONAL COMPUTER SYSTEM HAVING PERIPHERAL DEVICE BUS MASTERING AND METHOD THEREFOR", Ser. No. 08/627,992, filed concurrently herewith, now pending, in the name of the same inventors, and assigned to the same assignee as this Application. The disclosures of the above referenced applications are hereby incorporated by reference into this application.

BACKGROUND OF THE INVENTION

1. Field of the Invention

This invention relates generally to computer systems and, more specifically, to a system and method which allows for the implementation of peripheral device bus mastering in desktop personal computer (PC) systems via an Integrated Drive Electronics (IDE) hard disk controller or an Extended Capabilities Port (ECP) parallel port controller.

2. Background of the Invention

Bus mastering is the ability of peripheral input/output (I/O) devices to take over transactions on their own behalf. Currently, desktop PC systems provide limited support for peripheral device bus mastering. Peripheral device bus mastering is becoming an important strategy in desktop PC systems as the burden on central processing unit (CPU) bandwidth increases. Each reduction in time required by the CPU to control peripheral devices and their data flow results in an increase in available CPU bandwidth that includes operating system overhead for application interfaces and interrupt handling.

Therefore, a need existed to provide a system and method which allows for the implementation of peripheral device bus mastering in a desktop PC system. The system and method must require the minimal amount of additional hardware thereby reducing the cost of implementation of the system into a desktop PC. The system and method must also be able to initiate and complete the processing of unattended transactions and be able to handle multiple transactions without CPU intervention.

SUMMARY OF THE INVENTION

In accordance with one embodiment of the present invention, it is an object of the present invention to provide a desktop personal computer (PC) system having peripheral device bus mastering.

It is another object of the present invention to provide a desktop PC system having peripheral device bus mastering which requires a minimal amount of additional hardware.

It is another object of the present invention to provide a desktop PC system having peripheral device bus mastering which is able to initiate and complete the processing of unattended transactions and is able to handle multiple transactions without CPU intervention.

It is still another object of the present invention to provide a desktop PC system having peripheral device bus mastering which uses an Integrated Drive Electronics (IDE) hard disk controller for transferring data.

It is a further object of the present invention to provide a desktop PC system having peripheral device bus mastering which uses an Extended Capabilities Port (ECP) parallel port controller for transferring data.

BRIEF DESCRIPTION OF THE PREFERRED EMBODIMENTS

In accordance with one embodiment of the present invention, a system for implementing peripheral device bus mastering in a desktop personal computer (PC) system is disclosed. The system is comprised of a desktop PC system. Direct Memory Access (DMA) controller means are coupled to the desktop PC system for transferring data to and from memory of the desktop PC system. Hardware state machine means are coupled to the DMA controller means for programming the DMA controller means, generating and sending command signals, and receiving completion status after the transfer of data is complete. Descriptor means are stored in the memory of the desktop PC system. The descriptor means are used for describing each data transfer that the hardware state machine means initiates, controls, and completes. Register means are stored within the hardware state machine for storing the address information of the descriptor means. Bus controller means are coupled to the DMA controller means and the hardware state machine means for implementing a memory data transfer request from the DMA controller means and the hardware state machine means. Device controller means are coupled to the DMA controller means and the hardware state machine means for receiving and responding to the command signals from the hardware state machine means, transferring long streams of data to and from the DMA controller means, and generating and returning completion status to the hardware state machine means after the transfer of data is complete. The device controller means may be an IDE hard disk controller or an ECP parallel port controller.

In accordance with another embodiment of the present invention, a method for implementing peripheral device bus mastering in a desktop PC system is disclosed. The method comprises the steps of: providing a desktop PC system; providing DMA controller means coupled to the desktop PC system for transferring data to and from the memory of the desktop PC system; providing hardware state machine means coupled to the DMA controller means for programming the DMA controller means, generating and sending command signals, and receiving completion status after transfer of data is complete; providing descriptor means stored in the memory of the desktop PC system for describing each data transfer that the hardware state machine means initiates, controls, and completes; providing register means stored within the hardware state machine for storing the address information of the descriptor means; providing bus controller means coupled to the DMA controller means and the hardware state machine means for implementing a memory data transfer request from the DMA controller means and the hardware state machine means; and providing device controller means coupled to the DMA controller means and the hardware state machine means for receiving and responding to the command signals from the hardware state machine means, transferring long streams of data to and from the DMA controller means, and generating and returning the completion status to the hardware state machine means after the transfer of data is complete.

The foregoing and other objects, features, and advantages of the invention will be apparent from the following, more particular, description of the preferred embodiments of the invention, as illustrated in the accompanying drawings.

DETAILED DESCRIPTION OF THE PREFERRED EMBODIMENTS

Figure 1:
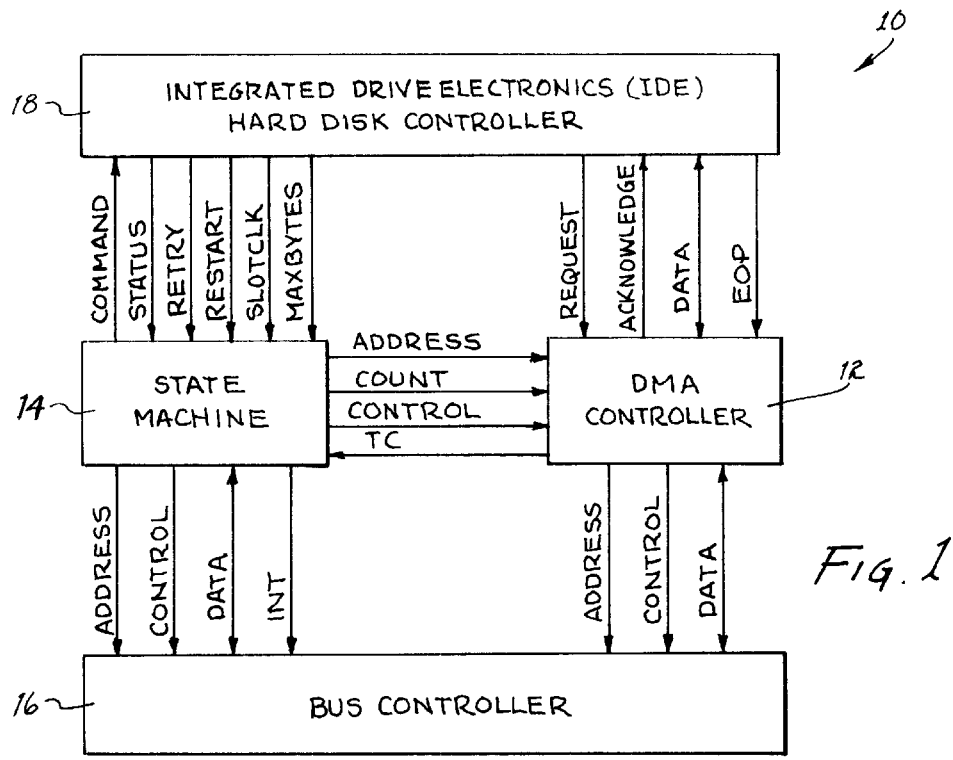
FIG. 1 is a simplified block diagram of a system for implementing peripheral device bus mastering in a desktop PC system via an IDE hard disk controller.

Referring to FIG. 1, one embodiment of a desktop personal computer (PC) system having peripheral device bus mastering 10 (hereinafter system 10) is shown. The system 10 is comprised of a Direct Memory Access (DMA) controller 12 for transferring data to and from the memory of the system 10. The DMA controller 12 may be implemented as a distributed DMA target slice. There are two main advantages of implementing the DMA controller 12 as a distributed DMA target slice. First, the distributed DMA target slice is a pre-existing block and thus, implementing the DMA controller 12 as a distributed DMA target slice does not require a new design. This will reduce the cost associated with implementing the system 10. Second, since the DMA target slice is an industry standard interface, standard software may be leveraged as well.

A hardware state machine 14 is coupled to the DMA controller 12 for programming the DMA controller 12, generating and sending command signals, and receiving completion status after the transfer of data is complete. The use of the hardware state machine 14 in the desktop PC system 10 is advantageous over other elements like an embedded micro-controller since the hardware needed to implement the hardware state machine 14 is much smaller, and therefore less costly than if a device such as the embedded micro-controller was used. It should also be noted that other elements such as the host Central Processing Unit (CPU) of the desktop PC system 10 could also be used to provide the functionality of the hardware state machine 14.

Figure 3:
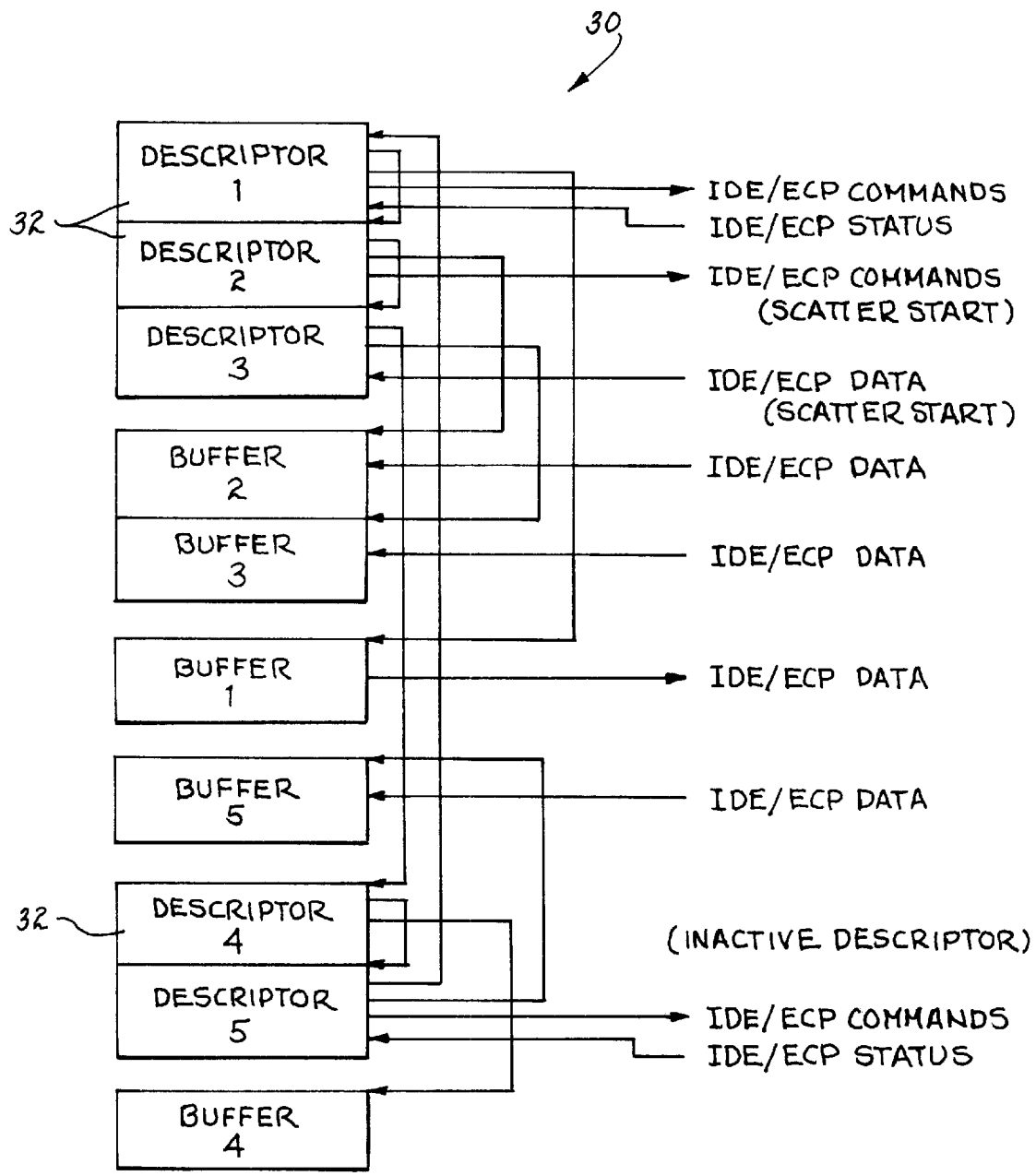
FIG. 3 is a simplified block diagram of a data buffer descriptor list used by the system depicted in FIGS. 1 and 2.

The hardware state machine 14 accesses a list of data buffer descriptors 30 (FIG. 3) that is created in the memory of the system 10. The data buffer descriptor list 30 is used by the hardware state machine 14 for minimizing the hardware requirements of the system 10, for implementing peripheral device bus mastering, and for providing a flexible interface for a user of the system 10. Each of the descriptors 32 in the data buffer descriptor list 30 describes each data transfer that the hardware state machine 14 initiates, controls, and completes. The particular descriptor 32 to be used is indicated by an address register which is located in the hardware state machine 14. The address register stores the address information of the descriptors 32.

A bus controller 16 is coupled to both the DMA controller 12 and to the hardware state machine 14. The bus controller 16 is used for implementing a memory data transfer request from the DMA controller 12 and from the hardware state machine 14.

In accordance with one embodiment of the present invention, a device controller such as an Integrated Drive Electronics (IDE) hard disk controller 18 is coupled to both the DMA controller 12 and to the hardware state machine 14. The IDE hard disk controller is used for receiving and responding to command signals from the hardware state machine 14, transferring long streams of data to and from the DMA controller 12, and generating and returning a completion status to the hardware state machine 14 after the transfer of data is complete. In response to certain command signals, the IDE hard disk controller 18 generates long streams of data in an intermittent fashion. Normally, any single data stream is targeted to a number of different host memory locations. The ability to handle multiple memory buffers for a single data transfer and the ability to dynamically add transfer requests to the list allows for an efficient high performance interface.

Figure 2:
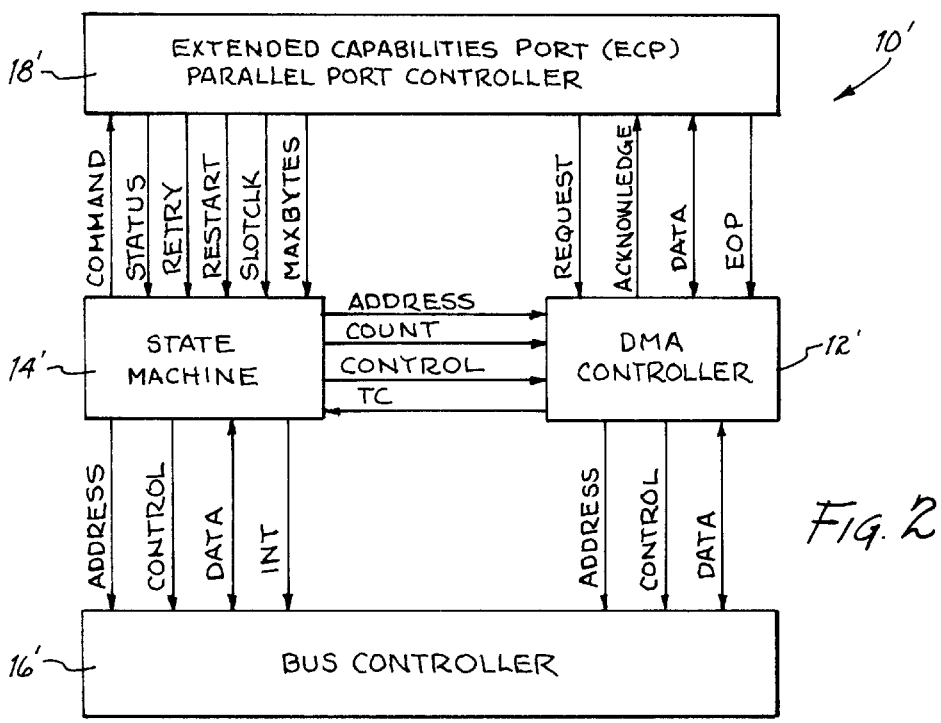
FIG. 2 is a simplified block diagram of a system for implementing peripheral device bus mastering in a desktop PC system via an ECP parallel port controller.

Referring to FIG. 2, another embodiment of the present invention is shown. According to this embodiment, the present invention is represented by the numeral and symbol 10'. Like the system 10 shown in FIG. 1, the system 10' is comprised of a DMA controller 12', a state machine 14', and a bus controller 16'. The DMA controller 12', the state machine 14', and the bus controller 16' all function in the same manner as the DMA controller 12, the state machine 14, and the bus controller 16 depicted in FIG. 1.

Under this embodiment, the IDE hard disk controller 18 of FIG. 1 is replaced by an Extended Capabilities Port (ECP) parallel port controller 18'. The ECP parallel port controller 18' functions in the same manner as the IDE hard disk controller 18 of FIG. 1 in that the ECP parallel port controller 18' is used for receiving and responding to command signals from the hardware state machine 14', transferring long streams of data to and from the DMA controller 12', and generating and returning a completion status to the hardware state machine 14' after the transfer of data is complete. However, the ECP parallel port controller 18' differs in that the ECP parallel port controller 18' interfaces with a number of different peripheral devices over a parallel bus. Each of the peripheral devices appears to the system 10' as a separate and independent data path. Since the interface is parallel, the data transfer rates are much higher, approaching hard disk rates, so the peripheral devices on the parallel bus may transfer long streams of data, as does the IDE hard disk controller 18. The intermixed characteristics of varied peripheral device types and large data transfers are handled as well as when the characteristics are not combined.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A system for implementing peripheral device bus mastering in a desktop personal computer (PC) system comprising, in combination:

desktop PC system comprising:
      Direct Memory Access (DMA) controller means for transferring data to and from memory of said desktop PC system;
      hardware state machine means coupled to said DMA controller means for programming said DMA controller means, generating and sending command signals, and receiving completion status after transfer of data is complete;

descriptor means stored in said memory of said desktop PC system for describing each data transfer that said hardware state machine means initiates, controls, and completes;

register means stored within said hardware state machine for storing address information of said descriptor means;

bus controller means coupled to said DMA controller means and said hardware state machine means for implementing a memory data transfer request from said DMA controller means and said hardware state machine means; and device controller means coupled to said DMA controller means and said hardware state machine means for receiving and responding to said command signals from said hardware state machine means, transferring long streams of said data to and from said DMA controller means, and generating and returning said completion status to said hardware state machine means after said transfer of data is complete.

2. A system for implementing peripheral device bus mastering in accordance with claim 1 wherein said device controller means is able to handle a multiple of memory buffers for a single data transfer.

3. A system for implementing peripheral device bus mastering in accordance with claim 2 wherein said device controller means is able to dynamically add transfer requests.

4. A system for implementing peripheral device bus mastering in accordance with claim 3 wherein said device controller means is an Integrated Drive Electronics (IDE) hard disk controller.

5. A system for implementing peripheral device bus mastering in accordance with claim 1 wherein said device controller means interfaces with said peripheral device over a parallel bus.

6. A system for implementing peripheral device bus mastering in accordance with claim 5 wherein said device controller means interfaces with a plurality of peripheral devices over a parallel bus.

7. A system for implementing peripheral device bus mastering in accordance with claim 6 wherein each of said plurality of peripheral devices appear to said system as an independent data path.

8. A system for implementing peripheral device bus mastering in accordance with claim 7 wherein said device controller means is an Extended Capabilities Port (ECP) parallel port controller.

9. A system for implementing peripheral device bus mastering in accordance with claim 1 wherein functionality of said hardware state machine means is provided by a host Central Processing Unit (CPU) of said desktop PC system.

10. A system for implementing peripheral device bus mastering in accordance with claim 1 wherein said DMA controller means is implemented as a distributed DMA target slice.

11. A method for implementing peripheral device bus mastering in a desktop personal computer (PC) system comprising the steps of:

providing desktop PC system;

providing Direct Memory Access (DMA) controller means coupled to said desktop PC system for transferring data to and from memory of said desktop PC system;

providing hardware state machine means coupled to said DMA controller means for programming said DMA controller means, generating and sending command signals, and receiving completion status after transfer of data is complete;

providing descriptor means stored in said memory of said desktop PC system for describing each data transfer that said hardware state machine means initiates, controls, and completes;

providing register means stored within said hardware state machine for storing address information of said descriptor means;

providing bus controller means coupled to said DMA controller means and said hardware state machine means for implementing a memory data transfer request from said DMA controller means and said hardware state machine means; and providing device controller means coupled to said DMA controller means and said hardware state machine means for receiving and responding to said command signals from said hardware state machine means, transferring long streams of said data to and from said DMA controller means, and generating and returning said completion status to said hardware state machine means after said transfer of data is complete.

12. The method of claim 11 wherein said step of providing device controller means further comprises the step of providing device controller means that are able to handle a multiple of memory buffers for a single data transfer.

13. The method of claim 12 wherein said step of providing device controller means further comprises the step of providing device controller means that are able to dynamically add transfer requests.

14. The method of claim 13 wherein said step of providing device controller means further comprises the step of providing device controller means that are an Integrated Drive Electronics (IDE) hard disk controller.

15. The method of claim 11 wherein said step of providing device controller means further comprises the step of providing device controller means that interfaces with said peripheral device over a parallel bus.

16. The method of claim 15 wherein said step of providing device controller means further comprises the step of providing device controller means that interfaces with a plurality of peripheral devices over a parallel bus.

17. The method of claim 16 wherein said step of providing device controller means further comprises the step of providing device controller means wherein each of said plurality of peripheral devices appear to said system as an independent data path.

18. The method of claim 17 wherein said step of providing device controller means further comprises the step of providing a device controller means that are an Extended Capabilities Port (ECP) parallel Port controller.

19. The method of claim 11 wherein said step of providing hardware state machine means further comprises the step of providing hardware state machine means wherein functionality of said hardware state machine means is provided by a host Central Processing Unit (CPU) of said desktop PC system.

20. The method of claim 11 wherein said step of providing DMA controller means further comprises the step of providing DMA controller means that are implemented as a distributed DMA target slice.

* * * * *